O. W. ROBERTS.
REVERSING GEARING.
APPLICATION FILED APR. 10, 1914.
1,185,717.
Patented June 6, 1916.
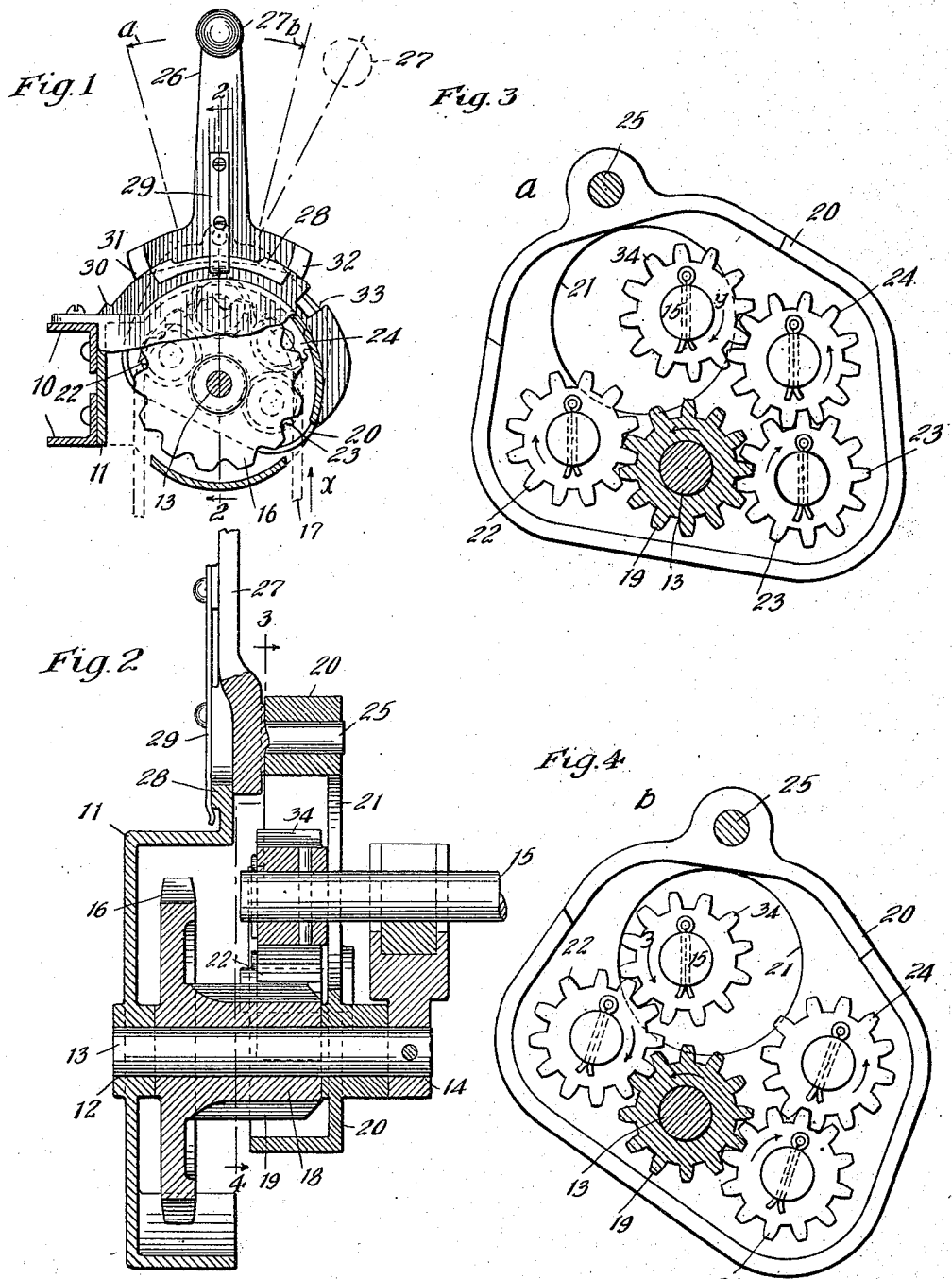
Witnesses:
Wm. Geiger
Joseph Harris
Inventor
Owen W. Roberts
By Munday, Evarts, Adcock & Clarke
his Attys.

UNITED STATES PATENT OFFICE.

OWEN W. ROBERTS, OF CHICAGO, ILLINOIS.

REVERSING-GEARING.

1,185,717.        Specification of Letters Patent.      Patented June 6, 1916.

Application filed April 10, 1914. Serial No. 830,871.

*To all whom it may concern:*

Be it known that I, OWEN W. ROBERTS, a citizen of the United States, residing in Chicago, in the county of Cook and State of Illinois, have invented a new and useful Improvement in Reversing-Gearing, of which the following is a specification.

This invention relates to improvements in reversing gearing and more particularly to such a mechanism adapted for use on washing machines.

The object of the invention is to provide a reversing gearing of simple construction, few parts compactly arranged and so designed that the movable elements are covered to thereby protect the operator.

The invention furthermore consists in the improvements in the parts and devices and in the novel combinations of the parts and devices herein shown, described or claimed.

In the drawing forming a part of this specification Figure 1 is a part side elevation, part vertical section of one form of mechanism embodying my improvements, parts being broken away to more clearly illustrate the arrangement. Fig. 2 is an enlarged vertical section taken substantially on the line 2—2 of Fig. 1 and Figs. 3 and 4 are sectional views taken on the line 3—4 of Fig. 2, Fig. 3 showing one position of the mechanism and Fig. 4 showing a different position.

In said drawing 10 denotes a frame which may be a portion of a washing machine frame. To the frame 10 is secured a bracket frame 11 having a bearing 12 therein for one end of a shaft 13, the other end of the shaft being supported in a suitable bearing 14 which constitutes a part of the washing machine frame and is preferably one of the brackets which supports the lower wringer roll shaft 15, which may be considered the driven member. Mounted on the shaft 13 is a sprocket gear 16, the hub of which, for the purposes of this invention, may be considered a driving shaft or member driven from any suitable source of power (not shown) by a sprocket chain indicated by dotted lines 17 in Fig. 1, the direction of rotation being as indicated by the arrow *x* in said figure. The hub of the sprocket gear 16 is extended as shown at 18 in Fig. 2 and the hub is formed with a gear 19. Oscillatably mounted on the shaft 13 is a second plate or bracket 20 having an enlarged opening 21 therein to provide clearance for the shaft 15. Mounted on the plate 20 are three gears or pinions 22, 23 and 24, the gears 22 and 23 being placed on opposite sides of and in mesh with the gear 19, the entire set of gears 19, 22, 23 and 24 being hereinafter termed a train of gears. Pivotally attached to the plate 20 by a stud or pin 25 is a lever 26 having a hand-grip 27. The lower end of the lever 26 fits between the upper edge 28 of the bracket 11 and is thus held in place, a leaf spring 29 being also provided which operates with the portion 28 as a friction device to assist in holding the lever 26 in its various positions. The upper edge 28 is curved on the arc of a circle having its center located in the axis of the shaft 13 and at one end of said edge a stop or shoulder 30 is provided to limit the movement of the lever 26 when it is moved in the direction indicated by the arrow *a*, the lever having a shoulder 31 coöperating with the shoulder or stop 30. The lever 26, on its opposite side, is provided with another shoulder 32 similar to the shoulder 31 which, when the lever is moved in the direction indicated by the arrow *b* drops into a notch or recess 33 formed on the upper edge of the plate or bracket 11. The wringer roll shaft 15, at its end, carries a gear 34. The train of gears already mentioned is carried by the plate 20 which is shiftable and which may, for the purposes of the invention, be considered to be a housing for the reversible gearing, or it may be considered to form with the bracket such a housing.

The operation of the device is as follows: When the parts occupy the position shown in Fig. 1, neither of the gears 22 or 24 is in mesh with the wringer roll gear 34 and consequently the latter will not be rotated. When, however, the lever 26 is shifted to the left as indicated by the arrow *a*, the parts will assume the position as indicated in Fig. 3, in which case the gear 24 will mesh with the gear 34 and rotate the latter in the direction indicated by the arrow *y* in said Fig. 3. When the lever 26 is shifted to the right as indicated by the arrow *b* in Fig. 1 the parts will assume the position indicated in Fig. 4, in which case the gear 22 will mesh with the gear 34 and rotate the latter in the direction indicated by the arrow *z*, which, of course, is the reverse of that shown in Fig. 3. On account of the relative rotations of the driving and driven gears when the parts are in the position shown in Fig. 4, it is necessary to prevent the plate or bracket 20 from being shifted to an inoperative position and it is for this reason that the notch 33 is provided, into which the shoulder 32 falls. In the other operating position, the relative directions of rotation of the various gears is such as to always tend to keep the gears in mesh and consequently no notch is necessary on the side where the shoulder is located.

From the preceding description, it will be seen that the arrangement is relatively simple and comprises few parts, nearly all of which may be cheaply and easily cast. It will also be evident that the plates or brackets 11 and 20 are so designed that they form an inclosing casing for the movable parts, thus minimizing the possible danger to the operator.

Although I have herein shown and described what I now consider the preferred embodiment of my improvements, yet it will be understood that various changes and modifications may be made without departing from the spirit of the invention, and all such changes and modifications are contemplated as come within the scope of the claims attached hereto. It will also be noted that when the lever 26 is moved in the direction indicated by the arrow $b$, the operator merely has to pull said lever to both throw the gears into mesh and to lock the same in position, the arrangement thus being much simpler than former devices where the locking mechanism has generally required separate attention.

I claim:

1. A mechanism of the character described comprising, in combination: a driving member, a driven member, gears for imparting rotation to said driven member in either direction from said driving member, a shiftable mounting for said gears, an operating lever pivotally connected to said mounting, a stop for engagement by said lever upon moving of the shiftable mounting in one direction, said lever being engageable and disengageable with said stop upon movement about its pivot, substantially as specified.

2. A mechanism of the character described comprising, in combination: a driving member, a driven member, means for transmitting rotation to said driven member in either direction from said driving member, including a shiftable housing, movement of the housing from a neutral position determining the direction of rotation imparted to said driven member, a lever connected to said housing, a stop engageable by said lever to lock the parts in desired relation, said lever having a pivotal movement independent of the movement of said housing into and out of locked position, substantially as specified.

3. A mechanism of the character described comprising, in combination: a driving member, a driven member, means for transmitting rotation to said driven member in either direction from said driving member, including a movable member, shifting of which results in transmission of motion from said driving to said driven member, a lever mounted on said movable member, and a fixed member, said fixed member and said lever having coöperating stops for locking said lever and said movable member in desired position, said lever having a movement independent of the movement of said movable member to engage and disengage said stops, substantially as specified.

4. A mechanism of the character described comprising, in combination: a driving member, a driven member, means for transmitting rotation to said driven member in either direction from said driving member, including a movable member, shifting of which movable member results in transmission of motion from said driving to said driven member, a lever mounted on said movable member, a fixed member, said fixed member and said lever having coöperating stops for locking said lever and said movable member in desired position, said lever having a movement independent of the movement of said movable member to engage and disengage said stops, and yielding means for holding said lever to maintain the parts in neutral position, substantially as specified.

5. A mechanism of the character described comprising, in combination: a driving member, a driven member, a fixed part having a substantially arcuate surface, means for transmitting rotation to said driven member in either direction from said driving member, including a shiftable part oscillatable about the axis of said surface of said fixed part to cause rotation to be imparted from said driving member to said driven member in accordance with the direction of its own movement, a lever pivoted on said shiftable part and having parts riding upon said arcuate surface, said surface being cut away and provided with stops for engagement by said parts of said lever to lock the lever and shiftable part in desired position, said lever having an independent movement into and out of locked position, substantially as specified.

6. A mechanism of the character described comprising, in combination: a driving member, a driven member, means for transmitting rotation to said driven member in either direction from said driving member, a housing for said means, a side of said housing being shiftable to bring said means into operation to impart rotation to said driven member in accordance with the direction of movement of said shiftable part, and a second part of said housing being stationary and having means serving to lock said shiftable part of the housing in desired operative position, substantially as specified.

7. A mechanism of the character described comprising, in combination: a driving gear; a plate oscillatable about a center coinciding with the axis of rotation of the gear; a driven shaft, a gear thereon; a plurality of gears carried by said plate in mesh with the driving gear, said plurality of gears with the driving gear forming a train of which the end gears are adapted to be brought alternately into mesh with the gear on the driven shaft; a bracket and an operating lever pivotally mounted on said plate, said lever having shoulders one of which is adapted to engage in a notch on said bracket, substantially as specified.

8. A mechanism of the character described comprising, in combination: a driving gear; a bracket, a plate oscillatable about a center coinciding with the axis of rotation of the gear; a driven shaft, a gear thereon; a plurality of gears carried by said plate in mesh with the driving gear, said plurality of gears with the driving gear forming a train of which the end gears are adapted to be brought alternately into mesh with the gear on the driven shaft; and an operating lever pivotally mounted on said plate, said lever having shoulders one of which is adapted to engage in a notch on said bracket, said plate and bracket together forming a casing to inclose said gears, substantially as specified.

Signed this 2nd day of April, 1914, in the presence of two witnesses:

OWEN W. ROBERTS.

Witnesses:
JOSEPH HARRIS,
THOMAS J. O'BRIEN.

Copies of this patent may be obtained for five cents each, by addressing the "Commissioner of Patents, Washington, D. C."